United States Patent
Isoda et al.

(10) Patent No.: US 11,061,907 B2
(45) Date of Patent: Jul. 13, 2021

(54) DATABASE MANAGEMENT SYSTEM AND METHOD

(71) Applicants: Hitachi, Ltd., Tokyo (JP); The University of Tokyo, Tokyo (JP)

(72) Inventors: Yuya Isoda, Tokyo (JP); Kazuhiko Mogi, Tokyo (JP); Kouji Kimura, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 90 days.

(21) Appl. No.: 16/282,342

(22) Filed: Feb. 22, 2019

(65) Prior Publication Data
US 2020/0042521 A1 Feb. 6, 2020

(30) Foreign Application Priority Data
Aug. 3, 2018 (JP) .................. 2018-146963

(51) Int. Cl.
*G06F 16/2455* (2019.01)
*G06F 16/2453* (2019.01)

(52) U.S. Cl.
CPC .... *G06F 16/2456* (2019.01); *G06F 16/24542* (2019.01)

(58) Field of Classification Search
CPC ........................ G06F 16/24542; G06F 16/2456
See application file for complete search history.

(56) References Cited

U.S. PATENT DOCUMENTS

| | | | | |
|---|---|---|---|---|
| 7,941,426 B2* | 5/2011 | Bestgen | ............ | G06F 16/24542 707/718 |
| 8,312,007 B2* | 11/2012 | Bestgen | ............ | G06F 16/24542 707/718 |
| 8,447,772 B2* | 5/2013 | Carston | ............ | G06F 16/24542 707/759 |
| 9,436,735 B1* | 9/2016 | Feng | ............ | G06F 16/24549 |
| 2009/0281992 A1* | 11/2009 | Bestgen | ............ | G06F 9/5027 |
| 2009/0282272 A1* | 11/2009 | Bestgen | ............ | G06F 1/206 713/320 |
| 2014/0149388 A1* | 5/2014 | Gruszecki | ............ | G06F 16/24545 707/714 |

FOREIGN PATENT DOCUMENTS

| | | |
|---|---|---|
| JP | 2008-210003 A | 9/2008 |
| WO | 2011/118425 A1 | 9/2011 |

* cited by examiner

*Primary Examiner* — Kris E Mackes
(74) *Attorney, Agent, or Firm* — Mattingly & Malur, PC

(57) ABSTRACT

If a query indicates joining of N (N is an integer of no less than 3) relation tables, a database management system calculates a query cost that is based on a power consumption amount for query execution, for each of a first query plan candidate in which a temporary table is generated and the temporary table is stored in a storage device unit with a first access cost, a second query plan candidate in which a temporary table is generated and the temporary table is stored in a storage device unit with a second access cost that is higher than the first access cost and a third query plan candidate in which the N relation tables are joined in a pipelined manner without generation of a temporary table, selects a relatively low-query cost query plan candidate and executes the query based on the query plan candidate.

15 Claims, 6 Drawing Sheets

USER DEFINITION INFORMATION
132

| ITEM | VALUE |
|---|---|
| 401 — TEMPORARY TABLE STORAGE DESTINATION | string |
| 402 — EXTENSION FLAG | 1 or 0 |
| 403 — FORCE FLAG | 1 or 0 |
| 404 — EXECUTION TIME COEFFICIENT | ...,-1, 0, 1,... |
| 405 — POWER CONSUMPTION AMOUNT COEFFICIENT | ...,-1, 0, 1,... |
| 406 — EXECUTION TIME UPPER LIMIT | 0, 1... |
| 407 — MAXIMUM POWER UPPER LIMIT | 0, 1... |
| 408 — POWER CONSUMPTION AMOUNT UPPER LIMIT | 0, 1... |

DATABASE MANAGEMENT SYSTEM AND METHOD

CROSS-REFERENCE TO PRIOR APPLICATION

This application relates to and claims the benefit of priority from Japanese Patent Application number 2018-146963, filed on Aug. 3, 2018 the entire disclosure of which is incorporated herein by reference.

BACKGROUND

The present invention generally relates to data processing and relates to, for example, database management.

In recent years, there has been concern about increase in power consumption for what is called big data analysis or other data processing.

Where a query that joins three or more relation tables from among a plurality of relation tables stored in a database is executed, temporarily generating a temporary table and joining a remaining relation table using the temporary table may enable more power consumption reduction than joining all of the relation tables in a pipelined manner. This is because "temporarily generating a temporary table and joining a remaining relation table using the temporary table" can suppress I/Os (inputs/outputs) to/from joined relation tables and bring a state of a storage device unit with such relation tables therein into a power save state. Here, the "temporary table" is a result of joining of some of the relation tables. The "storage device unit" means one or more storage devices.

PTL1 discloses a technique relating to power saving in database management and PTL2 discloses a technique relating to temporary tables.

PTL1: JP2008-210003
PTL2: WO2011/118425

SUMMARY

Joining the remaining relation tables using the temporary table does not always more reduce power consumption. For example, depending on the size of the temporary table, the temporary table may fail to be stored in a low-power consumption storage device unit (for example, a main memory) and may be thus stored in a high-power consumption storage device unit (for example, an HDD (hard disk drive)), resulting in increase in power consumption amount. In other words, a destination of the temporary table differs depending on the size of the temporary table and as a result, the amount of power consumption may possibly become large. Neither PTL1 nor PTL2 discloses or suggests such problem or means for solving such problem.

If a query indicates joining of N (N is an integer of no less than 3) relation tables, a database management system generates a plurality of query plan candidates including first, second and third query plan candidates and calculates a query cost for each of the query plan candidates. The database management system selects a relatively low-query cost (for example, a lowest-query cost) query plan candidate from the plurality of query plan candidates and executes the query based on the selected query plan candidate. For each of the query plan candidates, the query cost is a cost for executing the query based on the query plan candidate and is a cost based on a power consumption amount for query execution based on the query plan candidate. The first query plan candidate is a query plan in which a result of joining of the N relation tables is obtained through generation of a temporary table as a result of joining of M (M is an integer of no less than 2 but less than N) relation tables of the N relation tables and storing of the temporary table in a storage device unit with a first access cost. The second query plan candidate is a query plan in which a result of joining of the N relation tables is obtained through generation of the temporary table and storing of the temporary table in a storage device unit with a second access cost that is higher than the first access cost. The third query plan candidate is a query plan in which a result of joining of the N relation tables is obtained without generation of the temporary table. The first access cost affects the query cost of the first query plan candidate. The second access cost affects the query cost of the second query plan candidate.

Here, for the "storage device unit with the first access cost" and the "storage device unit with the second access cost", the storage device units themselves may be the same or different as long as the access costs are different. Even with the same storage device unit, the access cost differs if the method of accessing the storage device unit differs depending on the query plans. For example, I/O performance (access performance) differs between continuous reference and discontinuous reference to an HDD (Hard Disk Drive).

Reliability of keeping a power consumption amount for query execution low can be enhanced.

DETAILED DESCRIPTION OF EMBODIMENTS

Figure 1:
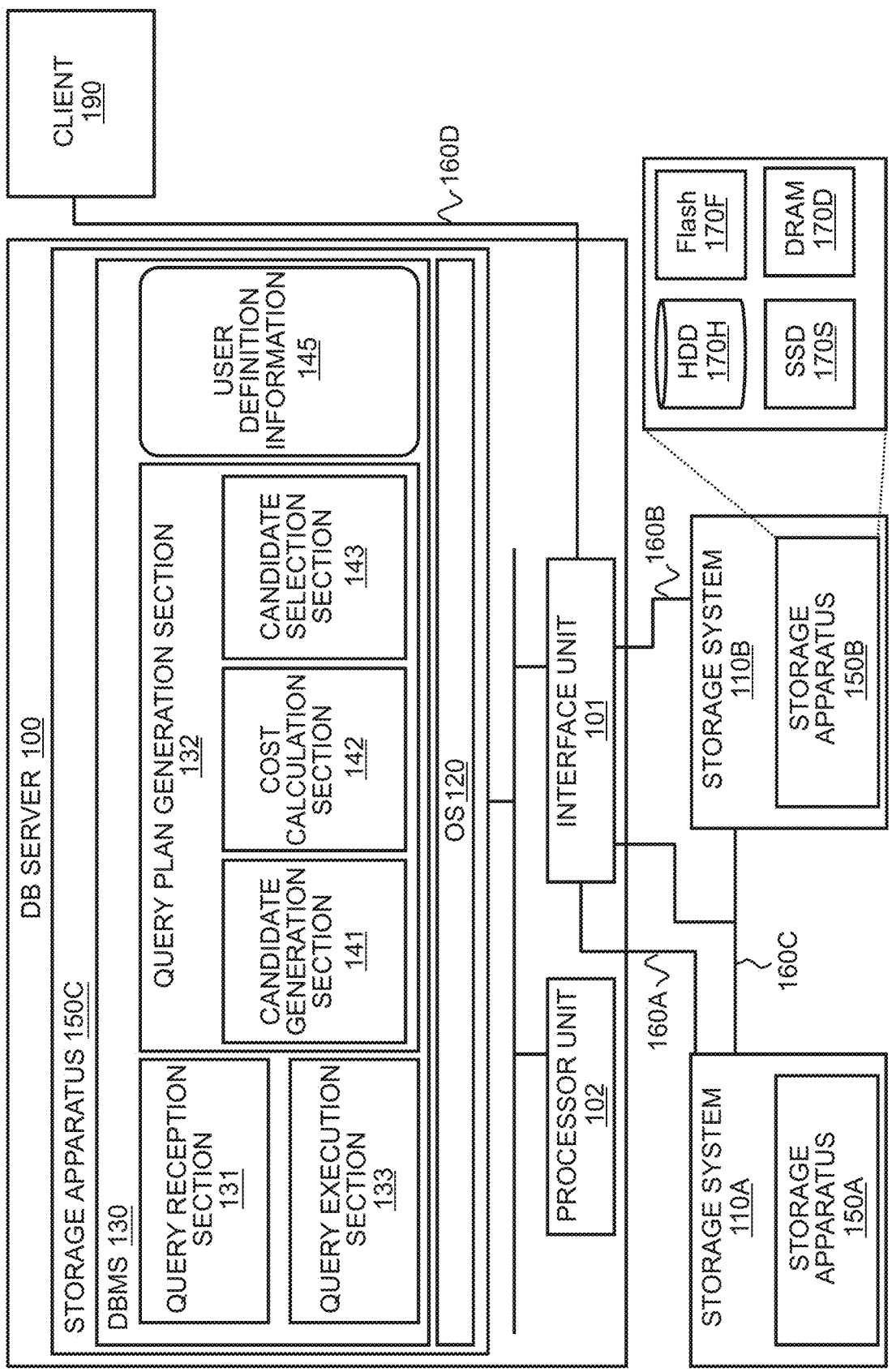
FIG. 1 is a diagram illustrating an example configuration of an entire system according to an embodiment of the present invention.

In the below description, a database management system is referred to as "DBMS" and a server included in the DBMS is referred to as "DB server". A source of issuance of a query to the DBMS may be a computer program (for example, an application program) external to the DBMS. The external computer program may be a program executed in the DB server or a program executed by an apparatus (for example, a client) connected to the DB server.

Also, in the below description, "interface unit" means one or more interfaces. The one or more interfaces may be one or more interface devices of a same type (for example, one or more NICs (network interface cards)) or two or more different types of interface devices (for example, an NIC and an HBA (host bus adapter)).

Also, in the below description, "storage device unit" means one or more storage devices. Each storage device may be a volatile memory (for example, a main memory), a non-volatile memory (for example, a flash memory or an SSD (solid-state drive) including a flash memory) or a disk device (for example, an HDD (hard disk drive)). A storage device unit may include storage devices that are all of a same type or a mixture of different types of storage devices.

Also, in the below description, "processor unit" means one or more processors. At least one processor is typically a CPU (central processing unit). Each processor may include a hardware circuit that performs a part or whole of processing.

Also, in the below description, each of some functions is described using an expression "kkk section", such function may be provided by execution of one or more computer programs by a processor unit or may be provided by one or more hardware circuits (for example, an FPGA (field-programmable gate array) or an ASIC (application-specific integrated circuit)). Where a function is provided by execution of a program by a processor unit, determined processing is performed arbitrarily using a storage device unit and/or an interface unit and thus, the function may be regarded as at least a part of the processor unit. Processing described with a function as the subject may be processing performed by a processor unit or an apparatus including the processor unit. A program may be installed from a program source. The program source may be, for example, a program distribution computer or a recording medium (for example, a non-transitory recording medium) that can be read by a computer. The description of each function is a mere example and a plurality of functions may be integrated as one function or one function may be divided into a plurality of functions.

Also, in the below description, where components of a same kind are described with no distinction therebetween, a part of a reference sign, the part being common to the components, is used, and where components of a same kind are described with distinction therebetween, respective reference signs may be used. For example, where storage apparatuses are not distinguished from one another, each of the storage apparatuses is referred to "storage apparatus 150", and where storage apparatuses are distinguished from one another, the storage apparatuses are referred to as "storage apparatus 150A", "storage apparatus 150B" and "storage apparatus 150C".

An embodiment of the present invention will be described below with reference to the drawings. Note that the present invention is not limited by the below description.

FIG. 1 is an example configuration of an entire system including a DB server that executes a DBMS according to an embodiment of the present invention.

A DB server 100 is an example of a computer system. The DB server 100 may be, for example, a personal computer, a work station or a main frame or may be a virtual computer configured by a virtualization program in any of these computers or may be provided in a cloud environment (for example, a computational resource pool including a plurality of computational resources such as an interface device, a storage device and a processor).

A client 190 and storage systems 110 are connected to the DB server 100.

More specifically, for example, the client 190 is connected to the DB server 100 via a network 160D. The client 190 is an example of a query issuance source and issues a query for a database to the DB server 100.

Each of the storage systems 110 includes a storage apparatus 150. Upon reception of an I/O request from the DB server 100, the storage system 110 performs I/O of data to/from the storage apparatus 150 in response to the I/O request. As the storage systems 110, for example, a storage system 110A including a storage apparatus 150A and a storage system 110B including a storage apparatus 150B are provided. The storage system 110A is connected to the DB server 100 via a network 160A. The storage system 110B is connected to the DB server 100 via a network 160B. The storage system 110A and the storage system 110B are connected via a network 160C and the network 160C is connected to the DB server 100.

The networks 160A to 160D may be networks that are different from one other in communication speed and power consumption or at least two of the networks 160A to 160D may be identical to each other. For example, each of the networks 160A and 160B may be an FC (fibre channel) network, the network 160C may be Ethernet (registered trademark) or InfiniBand and the network 160D may be a LAN (local area network).

The DB server 100 includes an interface unit 101, a storage apparatus 150C and a processor unit 102 connected to the interface unit 101 and the storage apparatus 150C. The DB server 100 may include an input device such as a keyboard and/or a pointing device (not illustrated) and an output device such as a liquid-crystal display (not illustrated). The input device and the output device may be connected to the processor unit 102. The input device and the output device may be integrated.

The interface unit 101 is connected to the networks 160A to 160D. The DB server 100 can communicate with the storage systems 110A, 110B and the client 190 via the interface unit 101 (via the networks 160A to 160D).

Each of the storage apparatuses 150A to 150C includes one or more storage devices 170. The storage apparatuses 150A to 150C may be identical or different in configuration. A storage apparatus 150 configured by two or more storage devices of a same type (for example, of a same level of I/O performance) may be provided and a storage apparatus 150 configured by two or more different types of storage devices (that are, for example, different in I/O performance) may be provided. An example of the latter storage apparatus 150 is the storage apparatus 150B. The storage apparatus 150B includes plural types of storage devices such as an HDD 170H, an SSD (solid-state drive) 170S, a flash memory 170F and a DRAM (dynamic random access memory) 170D. Each of the HDD 170H and the SSD 170S is an example of an auxiliary storage drive. The flash memory 170F is an example of an NVM (nonvolatile memory). The DRAM 170D is an example of a main memory. A database is stored in at least one of the storage apparatuses 150A to 150C.

The storage apparatus 150C stores therein programs to be executed by the processor unit 102 and data to be used by the programs. Examples of the program include a DBMS 130 and an OS (operating system) 120. The DBMS 130 receives a query from the client 190 and executes the query. In the execution of the query, in order to read data from the database or write data to the database, the DBMS 130 issues an I/O (input/output) request to the OS 120. The OS 120 receives the I/O request, issues an I/O request based on the I/O request to the relevant storage apparatus 150 and returns a result of the request to the DBMS 130.

The DBMS 130 includes a query reception section 131, a query plan generation section 132 and a query execution section 133 and manages user definition information 145. Note that the configuration of the DBMS 130 is a mere example. For example, a certain component may be divided in a plurality of components and a plurality of components may be integrated in a single component. For example, a cost calculation section 142 and a candidate selection section 143, which will be described later, may be provided outside the query plan generation section 132.

The query reception section 131 receives a query for the database from the client 190. The query is written in, for example, SQL (Structured Query Language).

Based on the received query, the query plan generation section 132 generates a query plan necessary for executing the query. The query plan is, for example, information including one or more database operators and a relationship in an order of execution of the database operators. The query plan may be indicated by, for example, a tree structure with the database operators as nodes and with the relationship in the order of execution of the database operators as edges.

In the present embodiment, "generate(s) a query plan" means generating one or more query plan candidates and selecting one query plan candidate that is an execution object from the one or more query plan candidates. The query plan generation section 132 includes a candidate generation section 141, the cost calculation section 142 and the candidate selection section 143. The candidate generation section 141 generates one or more query plan candidates. The cost calculation section 142 calculates a query cost for each of the one or more query plan candidates. For each query plan candidate, the query cost is a cost for executing the query based on the query plan candidate, which is a cost based on a power consumption amount for execution of the query based on the query plan candidate. There is a tendency that as the query cost is higher, the power consumption amount is larger (and/or the time of execution of the query is longer). The candidate selection section 143 selects a relatively-low query cost query plan candidate from the one or more query plan candidates. Note that the "relatively-low query cost query plan candidate" may be, for example, any of query plan candidates included in top X % (for example, X is a predetermined numerical value larger than 0) in ascending order of the query costs. In the present embodiment, typically (for example, if none of the query plan candidates exceeds upper limits of execution time, maximum power and a power consumption amount, which will be described later), the "relatively-low query cost query plan candidate" is a lowest query cost query plan candidate.

The query execution section 133 executes the query based on the generated query plan (selected query plan candidate) and returns a result of the execution of the query to the client 190. Also, based on the query plan, the query execution section 133 can arbitrarily change a state of some storage devices 170 to a power save state or cancel a power save state of some other storage devices 170. In order to change the state of each storage device 170, the query execution section 133 can transmit an instruction for the storage device 170 (for example, a state transition instruction designating a logical device that is based on the storage device 170). In response to the instruction, the state of the storage device 170 is made to transition by the storage device 170 (or the relevant storage system 110). Note that in query execution, the query execution section 133 generates a task for executing a database operator and executes the generated task, enabling issuance of a request for reading data necessary for the database operator corresponding to the task. The query execution section 133 may execute a plurality of database operators with a single task. For implementation of the task, for example, other than, e.g., a process or a kernel thread provided by the OS 120, a user thread provided by, e.g., a library may be used.

The user definition information 145 is information that is defined by a user of the DBMS 130 and is to be used for query cost calculation. At least a part of the user definition information 145 may be described in the query received by the query reception section 131. The user definition information 145 includes, for example, information indicating temporary table storage destinations, and coefficients and upper limits of parameters to be used for query cost calculation (for example, execution time, maximum power and a power consumption amount, which will be described later).

The above is a description of the entire system according to the present embodiment.

In the present embodiment, the database includes a plurality of relation tables. The plurality of relation tables are stored in a plurality of storage devices 170 in at least one of the storage apparatuses 150A to 150C. Also, depending on the selected query plan candidate, a temporary table is generated and stored in at least one of the storage apparatuses 150A to 150C. In the below description, relation tables and temporary tables may be collectively referred to as "tables". A single table may be stored in one storage device 170 or may be stored over two or more storage devices 170. Hereinafter, for each table, one or more storage devices 170 that store therein the table may be referred to as "storage device group". A plurality of tables may be stored in a common storage device group. Each of the storage apparatuses 150 and the storage device group may be an example of a storage device unit. The storage device group may be provided in a single storage apparatus 150 or may be provided over two or more storage apparatuses 150. Storage destinations of relation tables and temporary tables may be arbitrarily determined or may be defined in advance. For example, a database (a plurality of relation tables) may be stored in the storage apparatus 150A of the storage system 110A and temporary tables may be stored in the storage apparatus 150B of the storage system 110B.

Also, according to the example in FIG. 1, the storage apparatuses 150A to 150C are provided; however, some of the storage apparatuses 150 may be omitted. For example, relation tables and temporary tables may be stored in the storage apparatus 150A (or 150B) in the same storage system 110A (or 110B). Also, it is possible that: the storage systems 110A and 110B are not provided; and relation tables and temporary tables are stored in the storage apparatus 150C in the DB server 100.

Generation of a query plan will be described in detail below.

Figure 2:
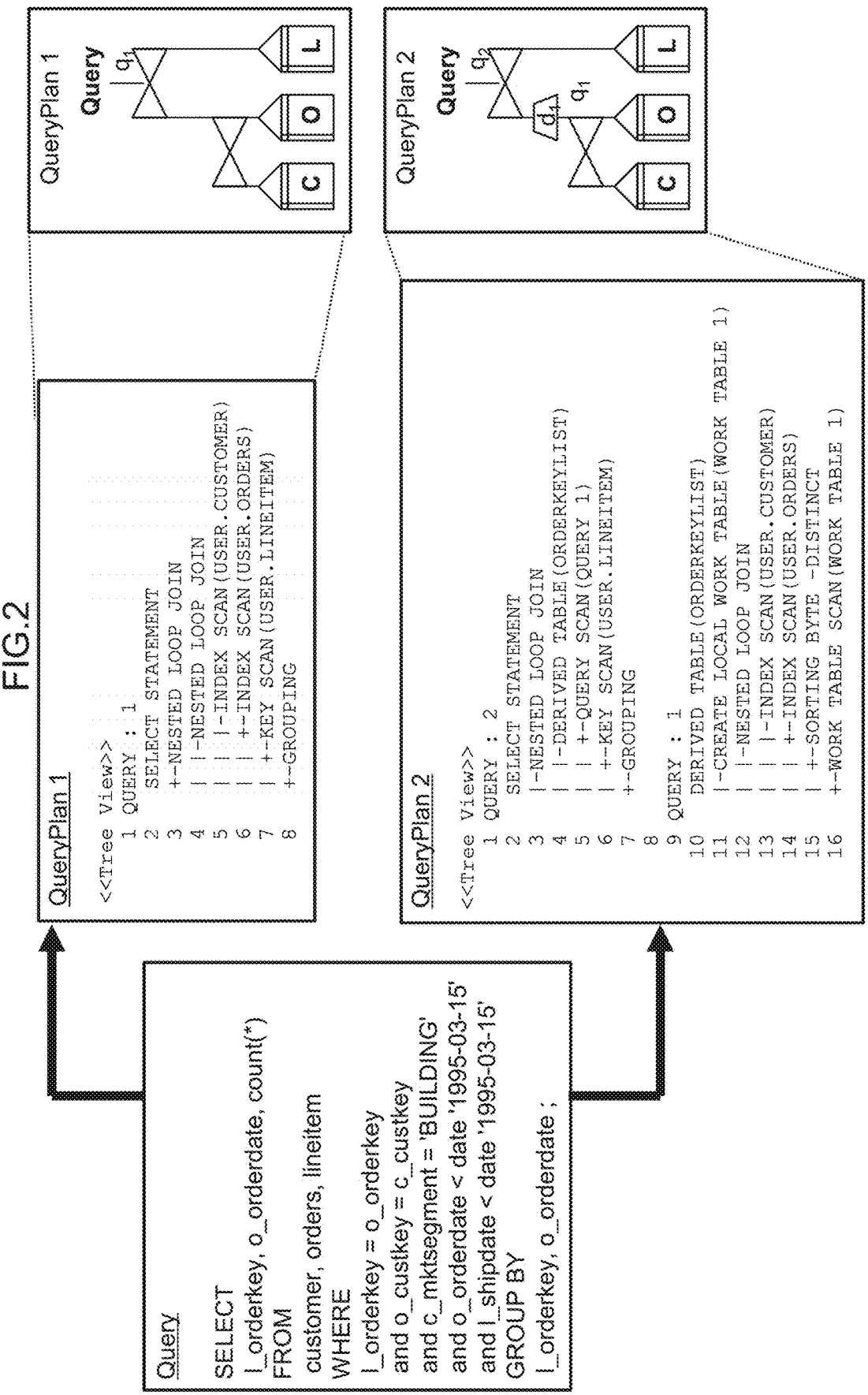
FIG. 2 is an overview diagram illustrating an example of generation of query plan candidates.

FIG. 2 is an overview diagram illustrating an example of generation of query plan candidates.

It is assumed that a received query is the query illustrated in FIG. 2. According to the query, it is necessary to join three relations tables that are relation table C (customer table), relation table O (order table) and relation table L (line item table). Relation tables C, O and L are an example of N (N is an integer of no less than 3) tables. At least one of the relation tables C, O and L may be accessed via an index in the database.

The candidate generation section 141 generates a plurality of query plan candidates based on the query illustrated in FIG. 2. The plurality of query plan candidates include a query plan candidate (query plan 1 (QP1)) in which three relation tables C, O and L are joined in a pipelined manner without generation of a temporary table and a query plan candidate (query plan 2 (QP2)) including non-pipelined processing that is generation of a temporary table (an example of a database operator). According to QP2, sign $d_1$ indicates a database operator for non-pipelined processing and signs $q_1$ and $q_2$ are respective subtrees of QP2, which are separated by the database operator $d_1$. In other words, according to QP2, a temporary table that is a result of joining of relation table C and relation table O is generated (subtree $q_1$) and subsequently the temporary table and remaining relation table L are joined (subtree $q_2$). The temporary table that is a result of joining of relation table C and relation table O is an example of a temporary table that is a result of joining of M (M is an integer of no less than 2 and less than N) relation tables.

Figure 3:
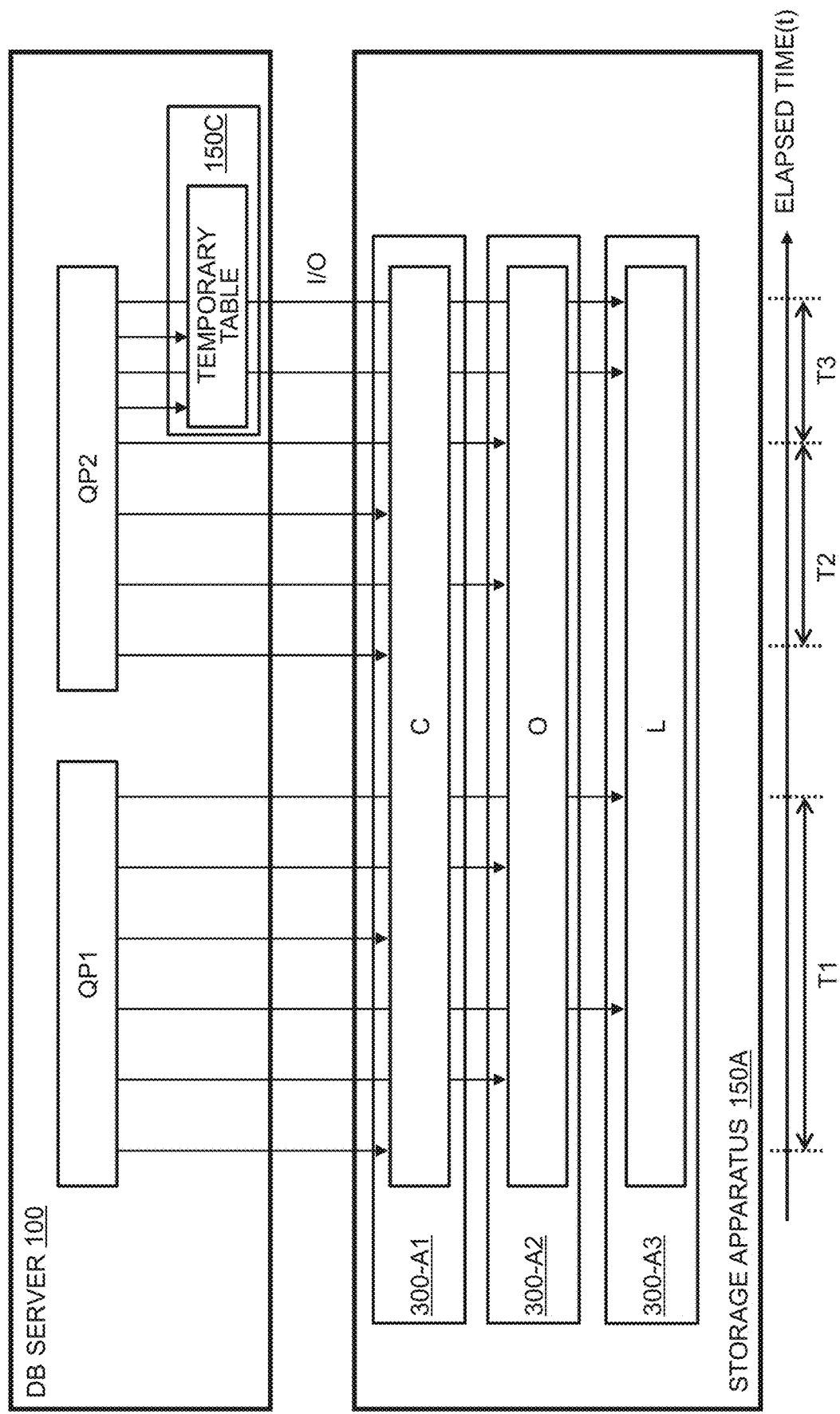
FIG. 3 is an overview diagram illustrating an example of an effect exerted by a database management system according to an embodiment.

FIG. 3 is an overview diagram illustrating an example of an effect exerted by the DBMS 130.

It is assumed that relation tables C, O and L are stored in the storage apparatus 150A. More specifically, it is assumed that: relation table C is stored in a storage device group 300-A1; relation table O is stored in a storage device group 300-A2; and relation table L is stored in a storage device group 300-A3.

In execution of QP1, during period T1, I/Os to/from respective relation tables C, O and L are interleaved during a short period of time, and thus, it is difficult to bring each of the storage device groups 300-A1 to 300-A3 into a power save state. Note that for each of the storage device groups 300, the "power save state" means a state in which at least one storage device (for example, all of storage devices) included in the storage device group 300 stops responding to an I/O request in order to reduce power consumption (for example, a power-off state, a sleep state or a standby state). A state other than the power save state may be called "normal state". QP1 is an example of a third query plan candidate.

On the other hand, in execution of QP2, as illustrated in the figure, it is possible to provide temporal locality to I/Os, and as a result, during the query execution period, it is possible to partly bring the states of storage device groups 300 into the power save state. More specifically, for example, during period T2 of processing for joining relation table C and relation table O (period of generating a temporary table), the query execution section 133 brings a state of the storage device group 300-A3 that stores therein relation table L into the power save state. This is because no I/O to/from relation table L is performed. The generated temporary table is stored at a location other than the storage device groups 300-A1 and 300-A2 that store therein relation tables C and 0 that are bases for the temporary table, for example, in the storage apparatus 150C in the DB server 100. Subsequently, during period T3 of processing for joining the temporary table and relation table L, the query execution section 133 cancels the power save state of the storage device group 300-A3 that stores therein relation table L and brings each of the storage device groups 300-A1 and 300-A2 that store therein relation tables C and 0 into the power save state. This is because I/O to/from relation table L is performed and no I/O to/from relation tables C and 0 is performed.

For each of QP1 and QP2, which are an example of a plurality of query plan candidates, the cost calculation section 142 calculates a query cost. In the example in FIG. 3, QP2 is lower in query cost than QP1 and thus QP2 is selected by the candidate selection section 143.

In the present embodiment, a storage device group 300 that can be a temporary table storage destination is any of the plurality of storage device groups 300, access costs of which are different from one another. In other words, for example, a query plan candidate in which non-pipelined processing is performed, like QP2, can be generated for each of the storage device groups 300 that can be selected as a temporary table storage destination. Therefore, in the present embodiment, the candidate generation section 141 generates at least a query plan candidate including storing of a temporary table in a storage device group 300 with a first access cost (an example of a first query plan candidate) and a query plan candidate including storing of a temporary table in a storage device group 300 with a second access cost that is higher than the first access cost (an example of a second query plan candidate). The first access cost affects a query cost of the first query plan candidate and the second access cost affects a query cost of the second query plan candidate. As described above, in the present embodiment, in addition to QP1, first and second query plan candidates according to temporary table storage destinations are generated. Then, for each of a plurality of query plan candidates including those query plan candidates, a query cost is calculated and a lowest-query cost query plan candidate is selected from the plurality of query plan candidates. In other words, both the possibility of a storage destination of a temporary table changing depending on the size of the temporary table and the possibility of generation of the temporary table resulting in increase in query cost are taken into consideration. Therefore, reliability of keeping a power consumption amount for query execution low can be enhanced.

An example of calculation of a query cost for each query plan candidate will be described. The below description will be provided taking one query plan candidate as an example (referred to as "object query plan candidate" from here to the start of the description of FIG. 4).

The object query plan candidate includes one or more database operators ($d_i$). Where Q is the object query plan candidate (an aggregate of the database operators), Q can be expressed as $Q=d_1, \ldots, d_n$. In this case, for the object query plan candidate (Q), execution time can be expressed as Expression 1, maximum power can be expressed as Expression 2 and a power consumption amount can be expressed as Expression 3.

$$T(Q) = \sum_{i=1}^{n} \{T(d_i)\} \qquad \text{[Expression 1]}$$

$$\max_{1 \leq i \leq n} W(d_i) \qquad \text{[Expression 2]}$$

$$E(Q) = \sum_{i=1}^{n} \{T(d_i)W(d_i)\} \qquad \text{[Expression 3]}$$

In other words, for the object query plan candidate (Q), the execution time, the maximum power and the power consumption amount are, for example, as follows.

Execution time (for example, [sec]) is a sum of one or more execution time periods for the one or more database operators.

Maximum power (for example, [W]) is a maximum value of one or more respective power consumption for the one or more database operators.

Power consumption amount (for example, [Wsec]) is a sum of one or more respective power consumption amounts for the one or more database operators.

Also, for each database operator, the execution time is, for example, based on at least one of the following items. The below description will be provided taking one database operator as an example (hereinafter referred to as "object database operator").

At least one of a size of a table part to be accessed (subjected to I/O) by the object database operator and a capacity of a storage area in which the table part is stored. The size of the table part is, for example, based on the number of records included in the table part and a size of each record. The capacity of the storage area in which the table part is stored is, for example, based on the number of pages storing the table part and a size of each page. It is possible that: a logical storage area based on one or more storage devices 170 is provided as a database area; and the database area includes a plurality of pages and is accessed on a page-by-page basis.

At least one of a throughput for the object database operator and a latency for the object database operator. The throughput for the object database operator may be, for example, a minimum value of a plurality of respective throughputs for a plurality of devices involved in the object database operator (for example, at least one or more devices from among the storage systems 110, the storage devices 170, the networks 160 and the DB server 100). This is because the device with the minimum throughput may become a bottleneck for the object database operator. The latency for the object database operator may also be, for example, a minimum value of a plurality of respective latencies for the plurality of devices involved in the object database operator.

Also, for each database operator, power consumption is, for example, based on the following. The below description will be provided taking one database operator as an example (hereinafter referred to as "object database operator").

At least one of power consumption of one or more storage devices 170 to be accessed in execution of the object query plan candidate and power consumption of one or more devices including the one or more storage devices 170. For example, power consumption of the object database operator is a sum of a plurality of respective power consumption of a plurality of devices involved in the object database operator (for example, one or more devices from among the storage system 110, the storage devices 170, the networks 160 and the DB server 100).

Also, for each database operator, the power consumption amount is, for example, as follows. The below description will be provided taking one database operator as an example (hereinafter referred to as "object database operator").

Product of execution time of the object database operator and power consumption for the object database operator.

The cost calculation section 142 calculates a query cost of the object query plan candidate (Q) based on the power consumption amount for the object query plan candidate. The cost calculation section 142 may calculate the query cost of the object query plan candidate based on execution time of the object query plan candidate instead of or in addition to the power consumption amount for the object query plan candidate. The query cost of the object query plan candidate may be the power consumption amount itself. Where the query cost is based on both the execution time and the power consumption amount, at least one of reflecting an execution time coefficient (weight) in the execution time and reflecting a power consumption amount coefficient in the power consumption amount may be performed.

Here, where the object query plan candidate is the above-described first query plan candidate, the query cost (for example, the execution time) of the object query plan candidate is affected by the first access cost (access cost relating to temporary table storing according to the first query plan candidate). The first access cost is, for example, based on at least one of a latency and a throughput for accessing a temporary table storage destination storage device unit and a capacity of the storage device unit. Likewise, where the object query plan candidate is the above-described second query plan candidate, the query cost (for example, the execution time) of the object query plan candidate is affected by the second access cost (access cost relating to temporary table storing according to the second query plan candidate). The second access cost is, for example, based on at least one of a latency and a throughput for accessing a temporary table storage destination storage device unit and a capacity of the storage device unit. At least one of the latency, the throughput and the capacity that are bases for the first access cost is superior to at least one of the latency, the throughput and the capacity that are bases for the second access cost.

In calculation of the query cost of the object query plan candidate (for example, at least one of the execution time, the maximum power and the power consumption amount for the object query plan candidate), a more specific parameter may be used. For the specific parameter, for example, a joining method (for example, whether the joining method is a nested loop join or a hush join) or an operation rate of a device involved in the database operator can be employed.

Figures 4, 5:
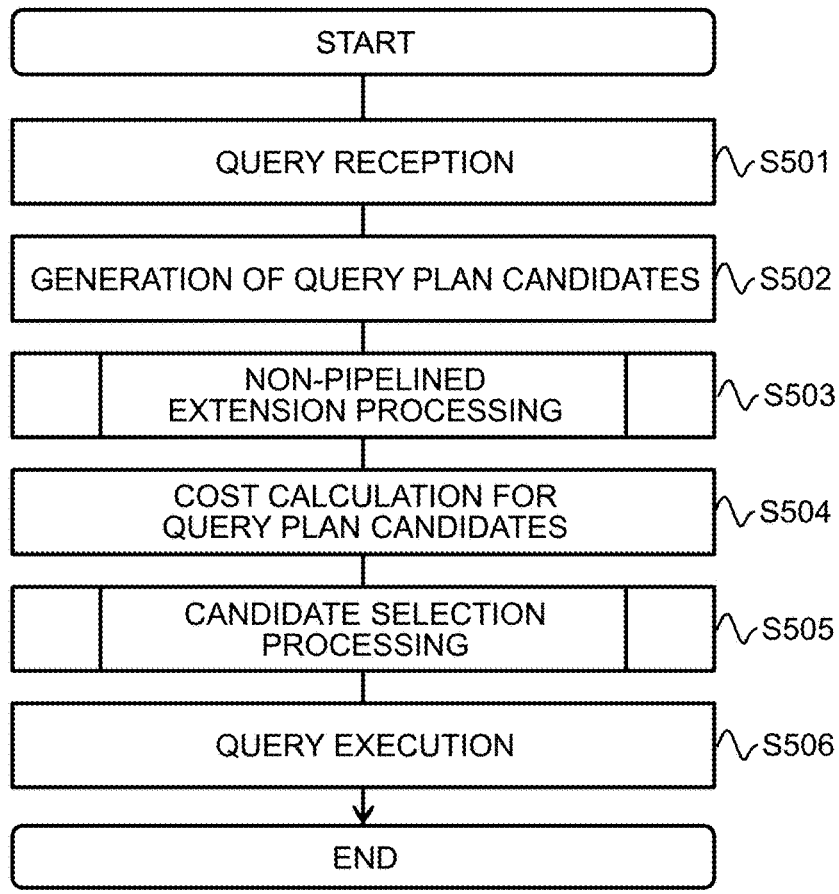
FIG. 4 is a diagram illustrating a configuration of user definition information.
FIG. 5 is a flowchart illustrating the overall flow of processing performed by a database management system according to an embodiment.

FIG. 4 is a diagram illustrating a configuration of the user definition information 145.

The user definition information 145 may be provided, for example, for each query or in common to two or more queries. The user definition information 145 includes information elements such as a temporary table storage destination 401, an extension flag 402, a force flag 403, an execution time coefficient 404, a power consumption amount coefficient 405, an execution time upper limit 406, a maximum power upper limit 407 and a power consumption amount upper limit 408. At least one of these information elements 401 to 408 may be designated by a received query. The below description will be provided taking one query as an example (referred to as "object query" in the description of FIG. 4). Note that illustrated intervals of respective values in each of information elements 404 to 408 are examples and intervals that are larger or smaller than the illustrated intervals may be employed.

The temporary table storage destination 401 indicates a location that can be a storage destination of a temporary table that can be generated in execution of the object query. A value of the temporary table storage destination 401 may include at least one of a type and the number of storage devices 170 or an ID of a logical storage area based on one or more storage devices 170.

The extension flag 402 indicates whether or not to perform extension of the query plan candidate (whether or not to generate a query plan candidate including non-pipelined processing). "1" indicates that extension of the query plan candidate is to be performed and "0" means that no extension of the query plan candidate is to be performed.

The force flag 403 indicates whether or not to perform forced execution. "Forced execution" means that the object query is to be executed even if there is no query plan candidate satisfying all of the execution time upper limit 406, the maximum power upper limit 407 and the power consumption amount upper limit 408 at all. "1" means that forced execution is to be performed and "0" means that no forced execution is to be performed.

The execution time coefficient 404 indicates a weight of execution time for each query plan candidate, and for each query plan candidate, the execution time coefficient 404 is a coefficient of execution time T(Q) of the query plan candidate when a query cost is calculated.

The power consumption amount coefficient 405 indicates a weight of a power consumption amount for each query plan candidate, and for each query plan candidate, the power consumption amount coefficient 405 is a coefficient of a power consumption amount E(Q) for the query plan candidate when a query cost is calculated.

For each query plan candidate, the execution time upper limit 406 indicates an upper limit of execution time for the query plan candidate.

For each query plan candidate, the maximum power upper limit 407 indicates an upper limit of maximum power for the query plan candidate.

For each query plan candidate, the power consumption amount upper limit 408 indicates an upper limit of a power consumption amount for the query plan candidate.

An example of processing performed in the present embodiment will be described.

FIG. 5 is a flowchart illustrating the overall flow of processing performed by the DBMS 130.

The query reception section 131 receives a query from the client 190 (S501).

The candidate generation section 141 generates query plan candidates based on the query received in S501 (S502) and performs non-pipelined extension processing that is processing for extending the query plan candidates generated in S502 (S503). Here, the non-pipelined extension processing in S503 may be performed in the query plan candidate generation in S502. More specifically, for example, in S502, the candidate generation section 141 performs pruning for preventing generation of query plan candidates expected to need a long period of execution time (for example, the execution time is expected to exceed the execution time upper limit 406); however, as a result of the non-pipelined extension processing being performed in the query plan candidate generation, the pruning can be avoided. For example, where the extension flag 402="1" and the force flag 403="1", no pruning is performed. As a result, a query plan candidate that does not satisfy at least one of the execution time upper limit 406, the maximum power upper limit 407 and the power consumption amount upper limit 408 but is low in query cost is expected to be generated.

The cost calculation section 142 calculates a query cost for each of the query plan candidates generated in S502 and S503 (S504). The candidate selection section 143 performs candidate selection processing for selecting one query plan candidate (S505).

The query execution section 133 executes a query based on the query plan candidate selected in S505 and returns a result of the execution to the client 190 (S506).

Figure 6:
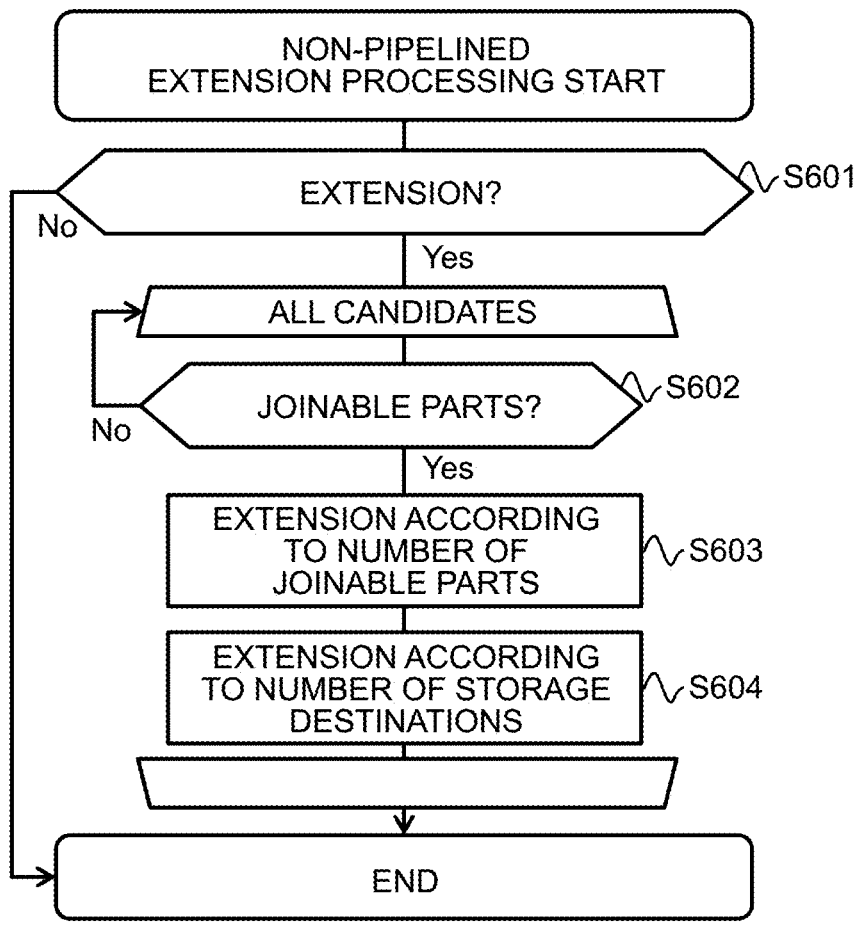
FIG. 6 is a flowchart illustrating the flow of non-pipelined extension processing (S503 in FIG. 5)

FIG. 6 is a flowchart illustrating the flow of the non-pipelined extension processing (S503 in FIG. 5).

The candidate generation section 141 determines whether or not extension flag="1" (S601). If a result of the determination in S601 is false (S601: No), the non-pipelined extension processing ends.

If a result of the determination in S601 is true (S601: Yes), the candidate generation section 141 performs S602 to S604 for each of the query plan candidates generated in S502. The below description will be provided taking one query plan candidate as an example (referred to as "object query plan candidate" in the description in FIG. 6).

The candidate generation section 141 determines whether or not there are joinable parts (parts for which non-pipelined processing is possible) in the object query plan candidate (S602). If a result of the determination in S602 is false (S602: No), S603 and S604 are not performed for the object query plan candidate.

If a result of the determination in S602 is true (S602: Yes), the candidate generation section 141 extends the object query plan candidate according to the number of joinable parts (S603). As a result, a number of query plan candidates, the number corresponding to the number of joinable parts, are generated based on the object query plan candidate. Next, for each of the query plan candidates generated in S603, the candidate generation section 141 extends the query plan candidate according to the number of temporary table storage destinations (storage destinations identified from the temporary table storage destination 401) (S604). As a result, for each of the query plan candidates generated in S603, a number of query plan candidates, the number corresponding to the number of temporary table storage destinations, are generated based on the query plan candidate.

Figure 7:
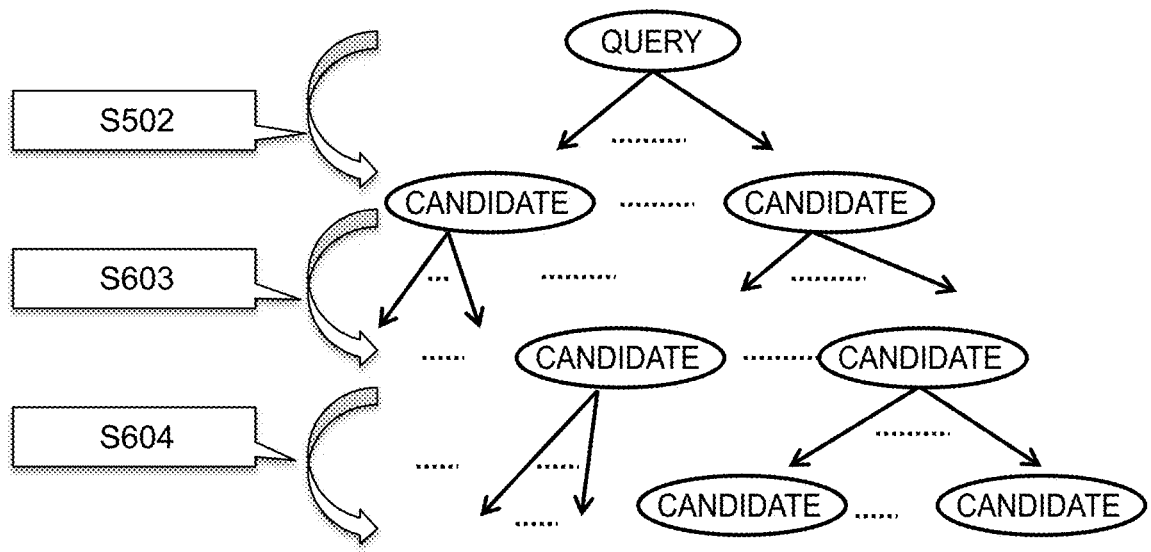
FIG. 7 is a schematic diagram of extension of query plan candidates.

FIG. 7 is a schematic diagram of extension of query plan candidates.

In S502, one or more query plan candidates are generated based on a query. Next, in S603, for each of the query plan candidates generated in S502, a number of query plan candidates, the number corresponding to the number of joinable parts in the query plan candidate, are generated based on the query plan candidate. Lastly, in S604, for each of the query plan candidates generated in S603, a number of query plan candidates, the number corresponding to the number of temporary table storage destinations, are generated based on the query plan candidate. Where one temporary table is to be stored over two or more storage devices 170, more query plan candidates are expected to be generated in S604 according to the number of combinations of the storage devices 170.

As described above, the number of query plan candidates depends on the number of joinable parts (database operators that can each generate a temporary table as a result of joining). The number of query plan candidates further depends on the number of temporary table storage destinations.

Figure 8:
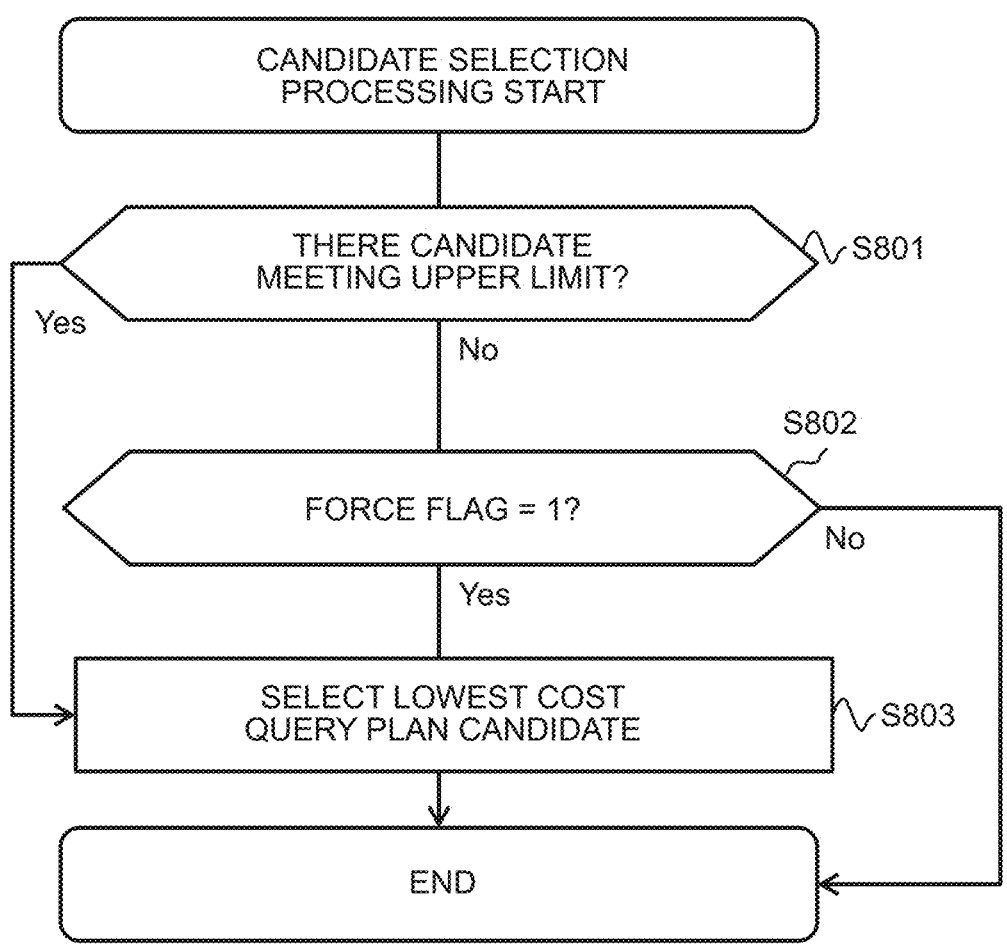
FIG. 8 is a flowchart illustrating the flow of candidate selection processing (S505 in FIG. 5).

FIG. 8 is a flowchart illustrating the flow of the candidate selection processing (S505 in FIG. 5).

The candidate selection section 143 determines whether or not at least one query plan candidate satisfies all of the execution time upper limit 406, the maximum power upper limit 407 and the power consumption amount upper limit 408 (S801).

If a result of the determination in S801 is true (S801: Yes), the candidate selection section 143 selects a lowest-query cost query plan candidate from one or more query plan candidates each satisfying all of the execution time upper limit 406, the maximum power upper limit 407 and the power consumption amount upper limit 408 (S803).

If a result of the determination in S801 is false (S801: No), the candidate selection section 143 determines whether or not the force flag 403="1" (S802). If a result of the determination in S802 is false (S802: No), the candidate selection processing ends.

If a result of the determination in S802 is true (S802: Yes), the candidate selection section 143 selects a lowest-query cost query plan candidate from one or more query plan candidates each not satisfying at least one of the execution time upper limit 406, the maximum power upper limit 407 and the power consumption amount upper limit 408 (S803).

In other words, according to the candidate selection processing, if there are one or more query plan candidates each satisfying all of the execution time upper limit 406, the maximum power upper limit 407 and the power consumption amount upper limit 408, the candidate selection section 143 selects a lowest-query cost query plan candidate from the one or more query plan candidates. On the other hand, if there is no query plan candidate satisfying all of the execution time upper limit 406, the maximum power upper limit 407 and the power consumption amount upper limit 408 at all but there is a setting for performing forced execution, the candidate selection section 143 selects a lowest-cost query cost query plan candidate from one or more query plan candidates each not satisfying at least one of the execution time upper limit 406, the maximum power upper limit 407 and the power consumption amount upper limit 408.

Although an embodiment has been described above, the embodiment is a mere example for description of the present invention and is not intended to limit the scope of the present invention only to the embodiment. The present invention can be carried out in various other modes.

What is claimed is:

1. A database management system comprising:
one or more processors;
a memory, coupled to the one or more processors, storing instructions that when executed by the one or more processors, configures the one or more processors to execute:
a query reception section that receives a query for a database including a plurality of relation tables from a query issuance source;
a query plan generation section that generates a query plan necessary for executing the query, based on the received query; and
a query execution section that executes the query based on the generated query plan and returns a result of the execution of the query to the query issuance source,
wherein if the query indicates joining of N (N is an integer of no less than 3) relation tables from among the plurality of relation tables,
wherein the query plan generation section:
generates a plurality of query plan candidates including first, second and third query plan candidates,
calculates a query cost for each of the plurality of query plan candidates, the query cost being a cost for executing the query based on the query plan candidate and being a cost based on a power consumption amount for query execution based on the query plan candidate, and
selects a relatively low-query cost query plan candidate from the plurality of query plan candidates,
wherein the generated query plan is the selected query plan candidate,
wherein the first query plan candidate is a query plan in which a result of joining of the N relation tables is obtained through generation of a temporary table as a result of joining of M (M is an integer of no less than 2 but less than N) relation tables of the N relation tables and storing of the temporary table in a storage device unit with a first access cost, and the first access cost affects the query cost of the first query plan candidate,
wherein the second query plan candidate is a query plan in which a result of joining of the N relation tables is obtained through generation of the temporary table and storing of the temporary table in a storage device unit with a second access cost that is higher than the first access cost, and the second access cost affects the query cost of the second query plan candidate, and wherein the third query plan candidate is a query plan in which a result of joining of the N relation tables is obtained without generation of the temporary table.

2. The database management system according to claim 1, wherein for each of the plurality of query plan candidates, the query cost is based on execution time that is a period of time to be taken for execution of the query plan candidate.

3. The database management system according to claim 1, wherein:
for each of the plurality of query plan candidates, the power consumption amount for query execution based on the query plan candidate is based on execution time to be taken for query execution based on the query plan candidate and power consumption for query execution based on the query plan candidate;
the execution time is based on at least one of
for each of one or more database operators in execution of the query plan candidate, at least one of a size of a table part to be accessed for the database operator and a capacity of a storage area in which the table part is stored, and
for each of one or more database operators in execution of the query plan candidate, at least one of a throughput for the database operator and a latency for the database operator; and
the power consumption is based on at least one of power consumption of one or more storage devices to be accessed in execution of the query plan candidate and power consumption of one or more devices including the one or more storage devices.

4. The database management system according to claim 2, wherein:
there is an upper limit to the execution time; and
the query plan generation section selects a relatively low-query cost query plan candidate from query plan candidates, the execution time of each of which is equal to or below the upper limit.

5. The database management system according to claim 4, wherein:
if there are one or more query plan candidates, the execution time of each of which is equal to or below the upper limit, the query plan generation section selects a relatively low-query cost query plan candidate from the one or more query plan candidates; and
if there is no query plan candidate, the execution time of which is equal to or below the upper limit but there is a setting for allowing the execution time to exceed the upper limit, the query plan generation section selects a relatively low-query cost query plan candidate from query plan candidates, the execution time of each of which exceeds the upper limit.

6. The database management system according to claim 1, wherein the number of the query plan candidates depends on the number of joinable parts, each of the joinable parts being a database operator that enables generation of a temporary table as a result of joining.

7. The database management system according to claim 6, wherein the number of the query plan candidates further depends on the number of temporary table storage destinations.

8. The database management system according to claim 1, wherein:
for the storage device unit with the first access cost, the first access cost is based on at least one of a latency and a throughput for accessing the storage device unit and a capacity of the storage device unit;

for the storage device unit with the second access cost, the second access cost is based on at least one of a latency and a throughput for accessing the storage device unit and a capacity of the storage device unit; and at least one of the latency, the throughput and the capacity that are bases for the first access cost is superior to at least one of the latency, the throughput and the capacity that are bases for the second access cost.

9. The database management system according to claim 1, wherein:
   at least one relation table of the M relation tables is stored in the first storage device unit;
   at least one relation table, of other than the M relation tables, of the N relation tables is stored in the second storage device unit;
   if the selected query plan candidate is either the first query plan candidate or the second query plan candidate, the query execution section
      changes a state of the second storage device unit to a power save state during referring to the M relation tables for generation of the temporary table; and
      changes a state of the first storage device unit to a power save state during referring to a relation table other than the M relation tables.

10. A database management method comprising:
   receiving a query for a database including a plurality of relation tables from a query issuance source;
   generating a query plan necessary for executing the query, based on the received query; and
   executing the query based on the generated query plan and returning a result of the execution of the query to the query issuance source, wherein:
   if the query indicates joining of N (N is an integer of no less than 3) relation tables from among the plurality of relation tables,
   the generation of the query plan includes
      generating a plurality of query plan candidates including first, second and third query plan candidates,
      calculating a query cost for each of the plurality of query plan candidates, the query cost being a cost for executing the query based on the query plan candidate and being a cost based on a power consumption amount for query execution based on the query plan candidate, and
      selecting a relatively low-query cost query plan candidate from the plurality of query plan candidates;
   the generated query plan is the selected query plan candidate;
   the first query plan candidate is a query plan in which a result of joining of the N relation tables is obtained through generation of a temporary table as a result of joining of M (M is an integer of no less than 2 but less than N) relation tables of the N relation tables and storing of the temporary table in a storage device unit with a first access cost, and the first access cost affects the query cost of the first query plan candidate;
   the second query plan candidate is a query plan in which a result of joining of the N relation tables is obtained through generation of the temporary table and storing of the temporary table in a storage device unit with a second access cost that is higher than the first access cost, and the second access cost affects the query cost of the second query plan candidate; and
   the third query plan candidate is a query plan in which a result of joining of the N relation tables is obtained without generation of the temporary table.

11. The database management method according to claim 10, wherein for each of the plurality of query plan candidates, the query cost is based on execution time that is a period of time to be taken for execution of the query plan candidate.

12. The database management method according to claim 11, wherein
   there is an upper limit to the execution time; and
   the generation of the query plan includes selecting a relatively low-query cost query plan candidate from query plan candidates, the execution time of each of which is equal to or below the upper limit.

13. The database management method according to claim 10, wherein the number of the query plan candidates depends on the number of joinable parts, each of the joinable parts being processing that enables generation of a temporary table as a result of joining.

14. The database management method according to claim 10, wherein:
   for the storage device unit with the first access cost, the first access cost is based on at least one of a latency and a throughput for accessing the storage device unit and a capacity of the storage device unit;
   for the storage device unit with the second access cost, the second access cost is based on at least one of a latency and a throughput for accessing the storage device unit and a capacity of the storage device unit; and
   at least one of the latency, the throughput and the capacity that are bases for the first access cost is superior to at least one of the latency, the throughput and the capacity that are bases for the second access cost.

15. The database management method according to claim 10, wherein:
   at least one relation table of the M relation tables is stored in the first storage device unit;
   at least one relation table, other than M relation tables, of the N relation tables is stored in the second storage device unit;
   if the selected query plan candidate is either the first query plan candidate or the second query plan candidate, the execution of the query includes
      changing a state of the second storage device unit to a power save state during referring to the M relation tables for generation of the temporary table; and
      changing a state of the first storage device unit to a power save state during referring to a relation table other than the M relation tables.

* * * * *